United States Patent [19]

Winkler

[11] 3,929,631

[45] Dec. 30, 1975

[54] COMPOSITIONS AND SYSTEMS TO RECOVER OILS FROM AQUEOUS AND SOLID SURFACES

[76] Inventor: Aniela Winkler, 120 Wilson Drive, Hazleton, Pa. 18201

[22] Filed: July 6, 1971

[21] Appl. No.: 160,204

Related U.S. Application Data

[63] Continuation of Ser. No. 725,529, April 30, 1968, abandoned.

[52] U.S. Cl. ............. 210/36; 210/40; 210/DIG. 21
[51] Int. Cl.² ............................................ C02B 9/02
[58] Field of Search .......... 210/24, 36, 40, DIG. 21; 260/2.5 B

[56] References Cited
UNITED STATES PATENTS

| | | | |
|---|---|---|---|
| 3,060,138 | 10/1962 | Wright | 260/2.5 |
| 3,265,616 | 8/1966 | Wyllie et al | 210/39 |
| 3,472,801 | 10/1969 | Lerman | 260/2.5 |
| 3,520,806 | 7/1970 | Haigh | 210/40 |
| 3,598,729 | 8/1971 | Baumann | 210/40 |

FOREIGN PATENTS OR APPLICATIONS

| | | | |
|---|---|---|---|
| 666,990 | 11/1965 | Belgium | 210/DIG. 21 |

*Primary Examiner*—Thomas G. Wyse
*Attorney, Agent, or Firm*—Wills, Green & Mueth

[57] ABSTRACT

Compositions and systems capable to effectively coagulate and recover oils from aqueous and solid surfaces, by application thereon of particulate expanded polystyrene and polystyrene-batadiene, said particles combined with meltable hydrocarbons such as paraffin, naphtalene, and mixtures thereof.

7 Claims, No Drawings

COMPOSITIONS AND SYSTEMS TO RECOVER OILS FROM AQUEOUS AND SOLID SURFACES

This is a continuation of Ser. No. 725,529 filed Apr. 30, 1968 now abandoned.

This invention is concerned with novel compositions and systems capable to effectively coagulate and recover oils and greasy dirt from aqueous and solid surfaces. These compositions belong to the class of expanded polystyrene resins which are herewith claimed as useful for the above purposes. These resins should preferably be in the shape of hollow grains and minispheres and small, hollow cylinders with particle sizes from 1/64 inch to 1 inch, also as mixtures thereof. These novel compositions comprise particulate expanded polystyrene and polystyrene-butadiene, combined with meltable hydrocarbons such as paraffin, naphtalene, and mixtures thereof.

Polystyrene is understood to a homopolymer of styrene monomer, which often contain methylstyrene copolymerized. Polystyrene-butadiene is understood to be a copolymer of styrene and butadiene monomers.

Expanded polystyrene and polystyrene-butadiene are understood to be cellular structures thereof, produced by the application of blowing agents, such as low-boiling hydrocarbons. These hydrocarbons cause a volume increase of up to and over a hundred times. Particulate expanded polystyrene and polystyrene-butadiene are understood to be predominantly monocellular structures in the form of loose, incoherent grains, minispheres, and mixtures thereof.

Commercial polystyrene is produced in small pellets and powders of various sizes and shapes from cylindrical to spherical, usually passing a 5-mesh sieve. More coarse and odd-shaped polystyrene powders are also used as starting materials under this invention.

Polystyrene or polystyrene-butadiene powders or pellets, in order to make them expandable, are impregnated with a blowing agent. The most frequently used blowing agent for polystyrene is low-cost propane.

In an autoclave, from 1 to 20 parts of propane are used under pressure and elevated temperature for impregnation of the polystyrene powder, making it heat expandable.

Cellular polystyrene, commonly called Styrofoam, is made for a great many lightweight and insulating objects and articles by industry. However, in the course of their production up to 30 percent of the Styrofoam is discarded as scrap or defective items. This Styrofoam scrap is almost worthless and usually is disposed of by burning. Most of the Styrofoam-made items and articles, such as drinking cups, egg and fruit containers, etc., are also discarded as waste after a single use. The presence of large quantities of Styrofoam in garbage is a nuisance, because Styrofoam melts easily before burning and tends to clog air ducts and grates in incinerators. Finding a use for Styrofoam scrap and waste will therefore solve many disposal problems.

I have found, and this is one of the main objects of this invention, a large and important use for Styrofoam scrap and waste.

My invention consists of disintegration of Styrofoam scrap and waste to predominantly monocellular incoherent small particles which I shall later call particulate expanded polystyrene or particulate Styrofoam.

A second object of my invention is to purposefully prepare predominantly monocellular, incoherent small particulate expanded, polystyrene by heat-induced expansion of expandable polystyrene or polystyrene-butadiene powders or pellets described before. Expandable polystyrene-butadiene gives a particulate foam which is more oil absorbent than particulate Styrofoam alone. It is also less brittle. Instead and in addition to butadiene, ethylene, propylene and butylene can be copolymerized with styrene.

I have found this particulate Styrofoam to be extremely useful to effectively coagulate and recover oils from acqueous and solid surfaces.

This valuable property can be considerably enhanced when particulate Styrofoam is combined with meltable hydrocarbons such as a low-cost paraffin wax, naphtelene, or their mixtures.

The great capability of particulate Styrofoam to effectively coagulate and separate oils from aqueous and solid surfaces is a result of a favorable combination of many factors related to the physical and chemical properties of particulate Styrofoam.

Particulate Styrofoam is always floatable on water because of its very low weight per volume. It is now wettable by water, and it is completely insoluble in water. On the other hand, it is perfectly wettable by oils and is soluble in oils at moderate temperatures. It burns without ash, and a solution of small quantities of particulate Styrofoam in oil has a negligible effect upon its viscosity and other physical and chemical properties.

Combinations of particulate Styrofoam with meltable hydrocarbons such as paraffin wax, naphtelene, and mixtures thereof exhibit improved properties when compared with uncombined particulate Styrofoam.

From recent technical literature and newspapers, it is well known that the chemical industry has not yet licked the problem of crude oil spillage from broken tankers. Industry also has not yet solved problems of pollution of sea and inland harbors, beaches, shipping lanes, canals, irrigation ditches, open-air water reservoirs, pools, etc. by oil and greasy dirt.

The often occurring breakup of oil tankers, such as of the Torrey Canyon off the English coast last year, the Liberian tanker Ocean Eagle, and the Greek tanker General Colocorronis this year, has shown what a mess oil spillage causes to sea shores and beaches for miles. The oil exterminates many forms of organic life, such as birds, fish, and sea and shore vegetation, while making the water and shores unusable for sport and recreational purposes.

Various emulsifiers and detergents were used to break up and eliminate the oil slicks. That only aggravated the situation, because those chemicals were highly poisonous to all forms of organic life. Other means rather unsuccessfully tried out to remove oils from water surfaces included solid absorbents for coagulation of oil on water. Sawdust, pumice, straw, expanded minerals like perlite, and synthetic urethane sponge materials were tried. All of these materials did a mediocre job, for they were heavier than water, and not well wettable by oil. Also, the used weight ratio to the spilled oil was high.

Therefore, the main features of this invention are the uses of particulate Styrofoam and particulate polystyrene-butadiene, as well as particulate Styrofoam and particulate expanded polystryrene-butadiene combined with meltable hydrocarbons described and defined before.

The compositions and systems in which particulate Styrofoam and particulate expanded polystyrene-butadiene are employed for scavenging and recovery of oil and greasy dirt from aqueous and solid surfaces, are presented in the examples which follow.

By solid surfaces; outdoor walks, drives, and grounds covered with concrete, stone, slate, terrazzo and asphalt, roofs and walls, interiors of reservoirs, tanks, and containers are meant.

It has been experimentally established that particulate Styrofoam and particulate expanded polystyrene-butadiene absorb oil and greasy dirt on contact. As soon as a relatively small number of particulate Styrofoam particles hit an oil-covered water surface, apparently under the influence of surface tension forces, the floating oil contracts around the Styrofoam particles producing large, almost-solid conglomerations. This can be easily observed with the naked eye. These lumpy products are easily skimmed off the water with simple mechanical means; such as perforated scoops, rotating paddles, etc.

Another useful feature of this invention is the ability to regenerate the absorbed oil by the heating of the particulate Styrofoam-oil conglomerates.

The following non-limiting examples are given by way of illustration only.

EXAMPLE 1

Styrofoam scrap and waste, in various odd-shaped forms, pieces, and segments preferably recovered as a by-product from the manufacturing of Styrofoam items, is coarsely shredded in a commercial shredder to chips and strips. This material presently has a very limited use in packaging of fragile objects, and sells for about 2 cents per pound. Therefore, it is a most attractive, inexpensive material for further conversion and applications under this invention.

Additional disintegration of these Styrofoam chips and strips in centrifugal or high-speed kinetic energy mills is made. Predominantly incoherent hollow, spherical, and cylindrical grains and minispheres are obtained.

In order to prevent the build-up of static electricity during the disintegration process, addition of up to one part water per hundred parts Styrofoam chips and strips became necessary.

The resulting fluffy material is collected into bags and according to this invention, is used for scavenging and recovery of oil and greasy dirt from water and solid surfaces. The scavenging takes place by hosing this material upon the gently agitating surface of the oil and greasy dirt contaminated water. In most cases, 1–2 pounds of it suffices to coagulate and recover up to a hundred pounds of oil, depending on the oil's consistency. The oil coalesces around each Styrofoam particle. These particles group together and grow to fairly large, almost-solid conglomerations, which are raked up and strained from the water, leaving the water surface almost completely clean.

The almost water-free Styrofoam-oil conglomerates are put into containers, where the Styrofoam dissolves in the oil after moderate heating to about 150°F. This solution, at ambient temperatures, shows the viscosity which the oil had before.

The Styrofoam grains and minispheres produced in this example lend themselves for use wherever oil is stored, transported and used; in tank farms, filling stations, auto parks and garages, car repair shops, industrial plants, oil tanker washing areas, boiler rooms, airports, and oil refineries. It is recommended for oil recovery from factory effluents, to remove floating oil and petroleum waste in boat bilges. Municipal and industrial water treatments plants should use it as a first step in water purification.

EXAMPLE 2

Styrofoam is disintegrated in a kinetic energy mill, similarly constructed to a Waring blender, together with non-refined paraffin wax crystals in a weight ratio of 1:1. Observation was made that during milling, the softer paraffin wax predominantly coated and impregnated the resulting non-coherent, hollow grains and minispheres of Styrofoam, as their surfaces acquired a waxy look and feel. Findings were that this combination of paraffin wax and Styrofoam particles considerably improves the coagulation of the oil upon and around the Styrofoam particles, and later helps in their dissolution in the oil, by lowering the necessary melting temperature. The resulting composite material is used preferably in the recovery of spilled heavy high specific gravity fuel oil from the sea, as the low specific gravity of paraffin wax helps to increase the overall floatability of the composition.

EXAMPLE 3

This example is patterned after Example 2, but here the oil scavenging material consists of 100 weight parts of particulate Styrofoam, made as described in Example 1, composed in a 2:1 ratio with a mixture of 70 percent yellow scale non-refined paraffin and 30 percent crude naphtalene crystals. The presence of naphtalene in this new material further helps in the recovery of the oil from the conglomerate, as described in Example 1, because naphtalene enhances the oil solubility of Styrofoam, by helping it to dissolve sooner and at a lower temperature.

EXAMPLE 4

100 weight parts of commercial polystyrene in coarse small cylindrical pellets passing a 10 mesh sieve are autoclaved at about 40°C with about 10 weight parts of propane. The propane impregnates the polystyrene pellets which swell to a larger size, now passing only a 5 mesh sieve. The expandable polystyrene pellets can be stored in closed drums for almost a year without considerable loss of the gaseous blowing agent. Such prepared expandable polystyrene powders and pellets are commercially available, although many manufacturers of Styrofoam articles are making it in their establishment for captive use.

Under my invention, as exemplified by this example, I am using these prepared expandable polystyrene powders and pellets as a starting material.

In a popping machine, similarly constructed to the one used for making popcorn, each grain and pellet of the expandable polystyrene is expanded to a noncoherent, predominantly hollow grain and minisphere. These are stored in bags or used immediately by hosing with the stream of generated expanded grains and minispheres on the water surface from which the oil and greasy dirt is to be removed. Instead of a popping machine, a specifically built hot-air operated gun may be used, similar to the one used for hot spray-coating of various objects with polyethylene.

Although the use of "virgin" expandable polystyrene powder and pellets to make incoherent, predominantly hollow expanded Styrofoam grains is more expensive than making it from Styrofoam scrap and waste, it has great merits in situations when great quantities of oil has to be speedily removed from suddenly foundering tankers near ports and beaches. In these situations, transporting and storing of thousands of bags of extremely low-density, incoherent expanded Styrofoam would be a logistic problem. Instead, rather compact bags with the expandable polystyrene powder feeding a popping machine or popping gun are calculated to be more economical.

When using the popmachine or popgun generated incoherent particulate Styrofoam for cleaning up thick oil slicks, the hosing should be performed as close as possible to the area to be treated to minimize wind losses. The spreading density should be related to how thick the oil layer is. As mentioned before, as soon as the incoherent expanded Styrofoam particles hit the oily water surface, a fast oil take-up results. This is evidenced by the coagulation of the oil around each particle of Styrofoam which coalesce to large lumps. If some free supernatant oil is still visible, more of the loose Styrofoam particles are added.

When the oil contaminated water surface is large, the coagulated Styrofoam-oil conglomerations are collected against a boom spillway gate, or other restraining surface, from where it is removed by shoveling, screening or screeding, and loaded into oil-recovery vessels or sumps.

EXAMPLE 5

For better performance in oil recovery and its regeneration, as already mentioned in Example 2, a composition of incoherent particulate Styrofoam with paraffin wax is a preferred material. When the incoherent expanded particulate Styrofoam is popped in a popping machine or popping gun, the presence of paraffin wax is necessary in order to prevent the popped expanded particles from sticking together in the process of expansion, and soon afterwards while still hot and sticky. A mixture of paraffin wax and naphtalene acts similarly. Other advantages provided by the combination of meltable hydrocarbons with particulate Styrofoam were already indicated in previous exmaples.

EXAMPLE 6

A specially prepared pelletized resin consisting of a copolymer of 85 percent styrene and 15 percent butadiene monomers is made expandable as described in Example 4. Incoherent, particulate expanded polystyrene copolymers, as exemplified above, have many valuable advantages in transportation, storage, and oil coagulation than particles made from polystyrene alone. They are less crushable and have a greater oil pick-up. Their conglomerations with the picked-up oil become fluid again in a few hours, even without heating, because of better intersolubility of oil and the polystyrene-butadiene copolymer. All these characteristics improve still more when this new incoherent, expanded granular polystyrene copolymer material is treated with a meltable hydrocarbon during its expansion described in Examples 4 and 5.

As will be apparent to those skilled in the art, numerous combinations of incoherent, particulate expanded polystyrene-type materials as such, also compounded with meltable hydrocarbons made by methods described herein, can be purposefully used for scavenging and recovery of oils and greasy dirt from aqueous and solid surfaces. These products and systems can be made and applied without departure from the spirit of the invention or the scope of the following claims:

I claim:
1. The method of recovering hydrocarbon liquids dispersed in water which comprises:
   forming porous predominantly hollow bodies of a polymeric substance selected from the group consisting of polystyrene, copolymers of polystyrene and mixed polymers thereof from an expandable form of said polymeric substance by heat popping at the site of said hydrocarbon liquids, said expandable form of said polymeric substances containing a meltable hydrocarbon;
   subsequently immediately contacting said hydrocarbon liquids at said site with said porous predominently hollow bodies; and
   removing said bodies containing absorbed hydrocarbon liquid from the water.
2. The method of claim 1 wherein said hydrocarbon liquids are hosed with a stream of said hollow bodies as they are formed at the site.
3. The method of claim 1 wherein said hollow bodies are generated at the site by popping pellet or powder of said polymeric substance under the influence of heat.
4. The method according to claim 1 wherein said bodies are of polystyrene foam.
5. The method according to claim 1 wherein said hydrocarbon liquid is oil.
6. The method according to claim 1 wherein said hydrocarbon liquid is oil which has been spilled into a body of water.
7. The method of claim 1 wherein the hollow bodies are copolymers of styrene with butadiene, ethylene, proplylene, butylene, and mixtures thereof.

\* \* \* \* \*